United States Patent
Patel

(10) Patent No.: US 9,042,902 B1
(45) Date of Patent: May 26, 2015

(54) THIRD-PARTY CONTROL OF CALL-RELATED SERVICES FOR A MOBILE STATION AND SUBSCRIBER

(71) Applicant: Polaris Wireless, Inc., Mountain View, CA (US)

(72) Inventor: Mahesh B. Patel, Saratoga, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 199 days.

(21) Appl. No.: 13/739,523

(22) Filed: Jan. 11, 2013

(51) Int. Cl.
*H04Q 7/10* (2006.01)
*H04W 8/12* (2009.01)

(52) U.S. Cl.
CPC .................................. *H04W 8/12* (2013.01)

(58) Field of Classification Search
CPC ............................ H04W 8/10; H04W 76/02
USPC ...................... 455/445, 428, 432.1
See application file for complete search history.

(56) References Cited

U.S. PATENT DOCUMENTS 5,884,179 A * 3/1999 Patel ............................ 455/445
6,081,731 A * 6/2000 Boltz et al. .................... 455/565

* cited by examiner

*Primary Examiner* — Ajit Patel
*Assistant Examiner* — Julio Perez
(74) *Attorney, Agent, or Firm* — Kaplan Breyer Schwarz & Ottesen, LLP

(57) ABSTRACT

A system and method are disclosed that provide for the control, by a third party, of call-related services that are provided to a wireless subscriber. For each mobile station whose calls and other communications are to be controlled, the server interposes itself between the serving Visitor Location Register (VLR) of the mobile station and the subscriber's Home Location Register (HLR). Through a sequence of standardized messages, the server represents itself to the unsuspecting HLR as the mobile station's new serving VLR. The server receives from the subscriber's HLR a first set of subscriber data that comprises data related to call-service permissions. The server then modifies a parameter from the first set, restricting an end-user service to the mobile station. The server then transmits the modified parameter to the serving VLR, which is used to block one or more types of calls that involve the mobile station.

30 Claims, 7 Drawing Sheets

THIRD-PARTY CONTROL OF CALL-RELATED SERVICES FOR A MOBILE STATION AND SUBSCRIBER

FIELD OF THE INVENTION

The present invention relates to telecommunications in general, and, more particularly, to controlling the call-related services that are provided for a mobile station and its subscriber.

BACKGROUND OF THE INVENTION

FIG. 1 depicts a diagram of the salient components of wireless telecommunications system 100 in the prior art. Wireless telecommunications system 100 comprises the depicted data-processing systems, which are interrelated as shown. The equipment that constitutes system 100 includes radio base station equipment, switching equipment, and service-control equipment, and is described in detail below. Wireless telecommunications system 100 provides wireless telecommunications service in well-known fashion to mobile station 101 when present in any of location areas 110-$i$, for $i=1$ through I, wherein I is a positive integer and equals two in the prior-art depiction. System 100 provides service in accordance with the Global System for Mobile Communications (GSM) set of standards and in well-known fashion.

Some of the equipment present in system 100 is associated with a specific location area 110-$i$. Such equipment includes base transceiver station 102-$i$, base station controller 103-$i$, mobile switching center 111-$i$, and visitor location register 112-$i$. In contrast, some other equipment present in system 100 is not associated with a specific location area. Such equipment includes home location register 113, gateway mobile switching center 114, and public-switched telephone network 120. Mobile station 101 is not fixed to a particular location area, but can be associated with any location area, depending on its present location. As depicted, mobile station 101 is presently associated with location area 110-1.

Base transceiver station (BTS) 102-$i$ is mobile station 101's access point to system 100. The BTS performs speech encoding, encryption, and other functions. Communications between mobile station 101 and a BTS 102-$i$ occur over an air interface. These communications, which include control signalling as well as voice and data traffic, are carried over designated channels via known methods. System 100 can include a different number of BTSs than that depicted.

Base station controller (BSC) 103-$i$ controls one or more BTSs. For example, the BSC handles radio channel allocation, frequency administration, receives power and signal measurements originating from the mobile stations, and controls handovers between BTSs that are connected to the same BSC. As depicted in FIG. 1, BSC 103-$i$ controls BTS 102-$i$. Although BSC 103-$i$ is depicted as being geographically remote from BTS 102-$i$, it can be co-located with a BTS or with mobile switching center 111. System 100 can include multiple BSCs, even within a given location area 110-$i$.

The interface between BSC 103-$i$ and each BTS 102-$i$ is known as the "Abis" link or interface. The communications carried over the Abis link include both voice/data information and control information. These communications are carried over a traffic channel and a signaling channel.

Mobile switching center (MSC) 111-$i$ provides at least some of the switching capability across location area 110-$i$. MSC 111-$i$ comprises a switch that orchestrates the provisioning and control of telecommunications service to the mobile stations. System 100 includes a plurality of MSCs, each responsible for a geographic region of the network, in this case a particular location area. MSC 111-$i$ can be connected to multiple BSCs, and it can interface with other MSCs. The interface between the mobile switching center and each base station controller is called the "A" link or interface.

MSC 111-$i$ also enables a subscriber of system 100 to place a call to, or receive a call from another network, such as Public Switched Telephone Network (PSTN) 120 or other wireless networks.

Gateway mobile switching center (GMSC) 114 serves as a gateway between two networks, in this case the wireless network portion of system 100 that serves the location areas, and PSTN 120.

Visitor location register (VLR) 112-$i$ is equipment for storing a database of the subscribers who have roamed into the jurisdiction of MSC 111-$i$, which is served by VLR 112-$i$. The data stored in VLR 112-$i$ is either received from HLR 113 or collected from mobile station 101, or both. VLRs 112-1 and 112-2 communicate with HLR 113 via "D" interfaces, communicate with each other via a "G" interface, and communicate with MSCs 111-1 and 111-2, respectively, via "B" interfaces. In some configurations, VLR 112-$i$ is integrated with MSC 111-$i$.

Home location register (HLR) 113 is equipment for storing a central database that contains details of each mobile station subscriber who is authorized to use one or more of location areas 110-1 and 110-2 as the subscriber's home network. HLR 113 stores details of every subscriber identity module (SIM) card issued by a wireless service provider. Each SIM has a unique identifier called an "international mobile subscriber identity," or "IMSI." An IMSI is a primary key to each HLR record. Another identifier that is associated with the SIM is a "MSISDN," which is often referred to as a "mobile subscriber integrated services digital network-number." Each MSISDN is also a primary key to the HLR record of a subscriber.

The MSISDN together with the IMSI are two important numbers used for identifying a mobile subscriber. The IMSI identifies the SIM, and the MSISDN is used for routing calls to the subscriber. The HLR data for a subscriber is stored for as long as a subscriber continues to subscribe to the service provided by the wireless service provider associated with HLR 113.

Some subscribers who are receiving wireless services within location area 110-1 or 110-2 are present within their home service area; information about these subscribers, and their SIMs and mobile stations, are stored within HLR 113. Other subscribers who are receiving wireless services within location area 110-1 or 110-2, however, are not present within their home service area. Instead, they are considered "roamers" within a service area that is operated by a service provider that is different than their home service provider. The subscriber data associated with a roamer are stored at an HLR other than HLR 113 and that is operated by the distant home service provider.

Regardless of whether a subscriber is in their home area or in a roaming area, the VLR that is currently serving the subscriber and the subscriber's own HLR continually exchange data with each other. This exchange of data is important, not only to provide communication services to the subscriber and associated mobile station, but also to keep track of and provide only those services that are allowed for each subscriber and mobile station. For example, a subscriber might be allowed to use one set of services in their home area, but a different set of services while roaming in a different area. The services allowed in the roaming area are typically a subset of the services allowed in the subscriber's home area.

SUMMARY OF THE INVENTION

The present invention provides for the control, by a third party, of call-related services that are provided for a wireless subscriber and an associated mobile station, within a wireless telecommunications system. There are operational scenarios where controlling such services has to be done effectively, but in a very subtle way. For example, local law enforcement officials, acting as the third party, might deem it necessary to restrict the wireless service that is normally available to a targeted person of interest, such as a terrorist or other person suspected of criminal intent. This restricting of services has to be made quickly in order to prevent the person from using their mobile station for criminal purposes. At the same time, it is also necessary that the person not be tipped off that their service is being tampered with. Additionally, it might be necessary to keep the person's home service provider from discovering the tampering, so that the service provider does not intervene with law enforcement's operation.

To that end, and in accordance with the illustrative embodiment, a call control server acquires a list of one or more mobile station identifiers that correspond to subscribers (i.e., the target persons of interest) whose mobile stations are to be controlled. The server of the illustrative embodiment shares the list with one or more cooperative Visitor Location Registers (VLR) within the wireless telecommunications system, a GSM-based system in this case. The server receives notification from one or more of the VLRs that a targeted mobile station is present within one of the corresponding location areas.

For each targeted mobile station whose communications are to be controlled, the call control server interposes itself between the serving VLR of the mobile station and the subscriber's HLR. Through a sequence of message exchanges, the server represents itself to the unsuspecting HLR as the mobile station's new serving VLR. Advantageously, the server uses standardized, GSM Mobile Application Part (MAP) messages, in order to successfully pose as the serving VLR to the subscriber's HLR.

The call control server receives from the subscriber's HLR a first set of subscriber data that corresponds to the subscriber's targeted mobile station. The subscriber data comprises data related to call-service permissions for different types of service conditions such as outgoing calls, incoming calls, roaming, and invocation of call transfer, for example and without limitation. The server generates a second set of subscriber data comprising a modified parameter whose value differs from the corresponding parameter in the received first set of subscriber data. The generating of the second set is based on the value of the received identifier of the mobile station. The value of the modified parameter restricts an end-user service to the mobile station, relative to the value of the corresponding parameter in the first set. The server then transmits the second set of subscriber data to the serving VLR, which is serving a location area in which the targeted mobile station is present. In some embodiments of the present invention, the modified parameters restrict call-related services not only for the targeted mobile station, but for other mobile stations within a given area (e.g., location area, etc.) as well.

When an incoming call or outgoing call is received, the call control server or serving VLR, or both, controls the call based on the modified second set of subscriber data. For example, the modified parameter might specify that no incoming calls are to be connected to the mobile station; in this case, the call control server or serving HLR would reject the call setup attempt, but ostensibly for a seemingly innocuous reason such as for no call resources being available.

In some embodiments of the present invention, the HLR of the targeted subscriber is cooperative with the call control server in modifying the service permissions of a targeted subscriber and mobile station. In these embodiments, the server can directly control the HLR, in order to have the HLR directly modify the call service permissions. Even in scenarios where the HLR is cooperative, however, the call control server is capable of interacting with the cooperative HLR via the standardized messages described above. Interaction in this way eliminates the need to modify the HLR's software or, at least, to have to coordinate operations with the service provider that maintains the HLR.

Although the illustrative operational scenario is for stealthy law enforcement, the concepts disclosed herein can be applied to other scenarios, as those who are skilled in the art will appreciate after reading this specification.

The illustrative embodiment features call control within a GSM-based, wireless telecommunications system. However, it will be clear to those who are skilled in the art, after reading this specification, how to make and use alternative embodiments of the present invention that operate within a different type of telecommunication system.

An illustrative embodiment of the present invention comprises: receiving, by a data-processing system, i) a first set of subscriber data that corresponds to a predetermined mobile station and ii) an identifier of the mobile station; generating, by the data-processing system, a second set of subscriber data comprising a modified parameter whose value differs from the corresponding parameter in the received first set of subscriber data, wherein the generating of the second set is based on the value of the received identifier of the mobile station, and wherein the value of the modified parameter restricts an end-user service to the mobile station, relative to the value of the corresponding parameter in the first set; and transmitting, by the data-processing system, the second set of subscriber data to a Visitor Location Register (VLR) serving a location area in which the mobile station is present.

DETAILED DESCRIPTION

For the purposes of this specification, the following terms and their inflected forms are defined as follows:

The term "location" is defined as a zero-dimensional point, a finite one-dimensional path segment, a finite two-dimensional surface area, or a finite three-dimensional volume.

The term "location area" is a geographic region within which wireless telecommunication service is provided to subscribers via a non-empty set of base stations and other associated equipment, such as a serving mobile switching center (MSC) and a serving visitor location register (VLR). One or more location areas can be associated with a corresponding MSC and VLR.

The term "mobile station" is defined as a wireless telecommunications terminal that is capable of transmitting and/or receiving communications wirelessly. As is well known to those skilled in the art, a mobile station is also commonly referred to by a variety of alternative names such as a wireless transmit/receive unit (WTRU), a user equipment (UE), a wireless terminal, a fixed or mobile subscriber unit, a pager, a cellular telephone, a personal digital assistant (PDA), a computer, or any other type of device capable of operating in a wireless environment.

The terms used to describe elements of a wireless telecommunications network are given their industry-established meanings, unless otherwise indicated. These terms include: mobile switching center, base station controller, base transceiver station, gateway mobile switching center, Abis link, A-link, B-link, D-link, G-link, and subscriber data.

Figure 1:
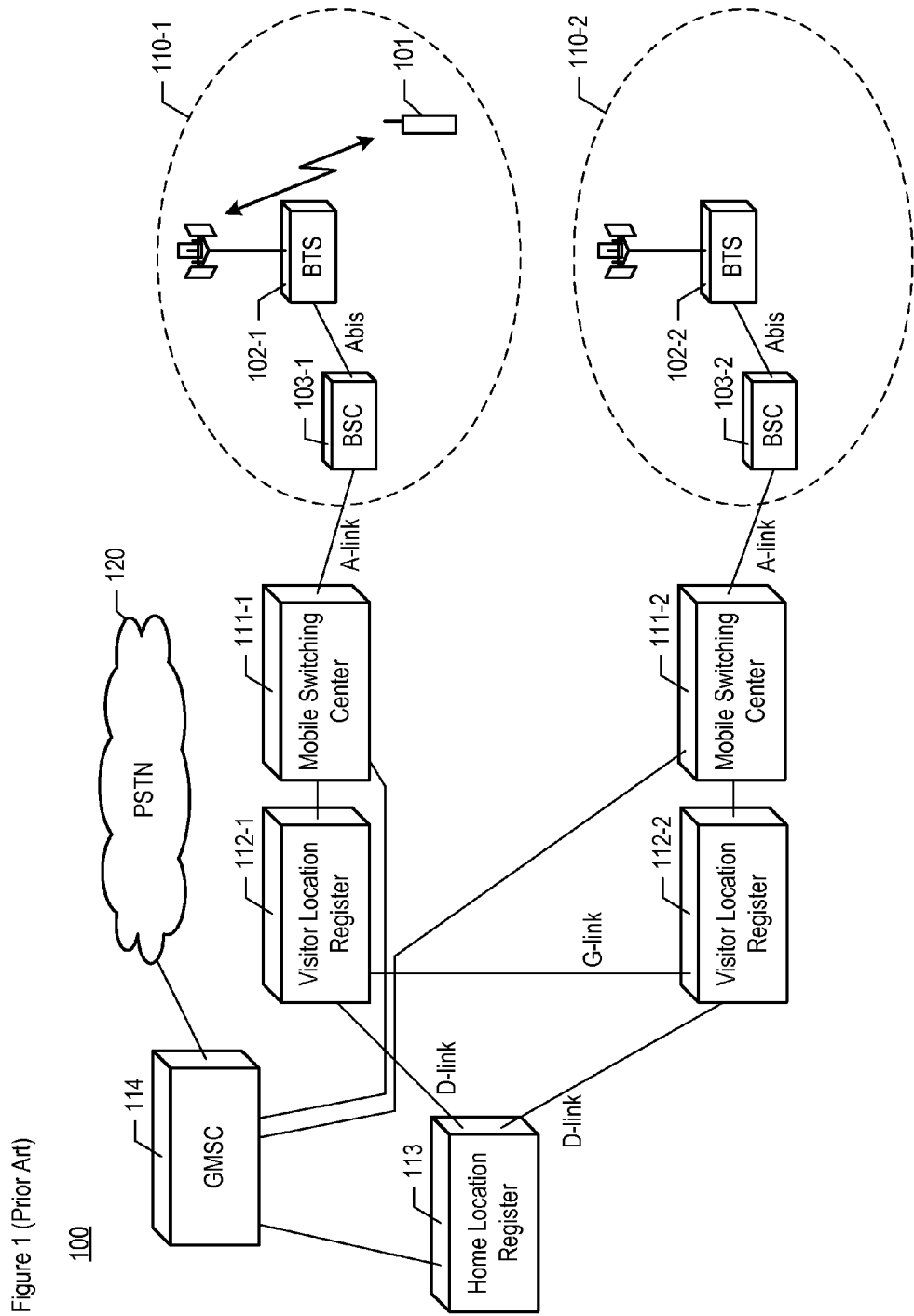
FIG. 1 depicts a diagram of the salient components of wireless telecommunications system 100 in the prior art.
Figure 2:
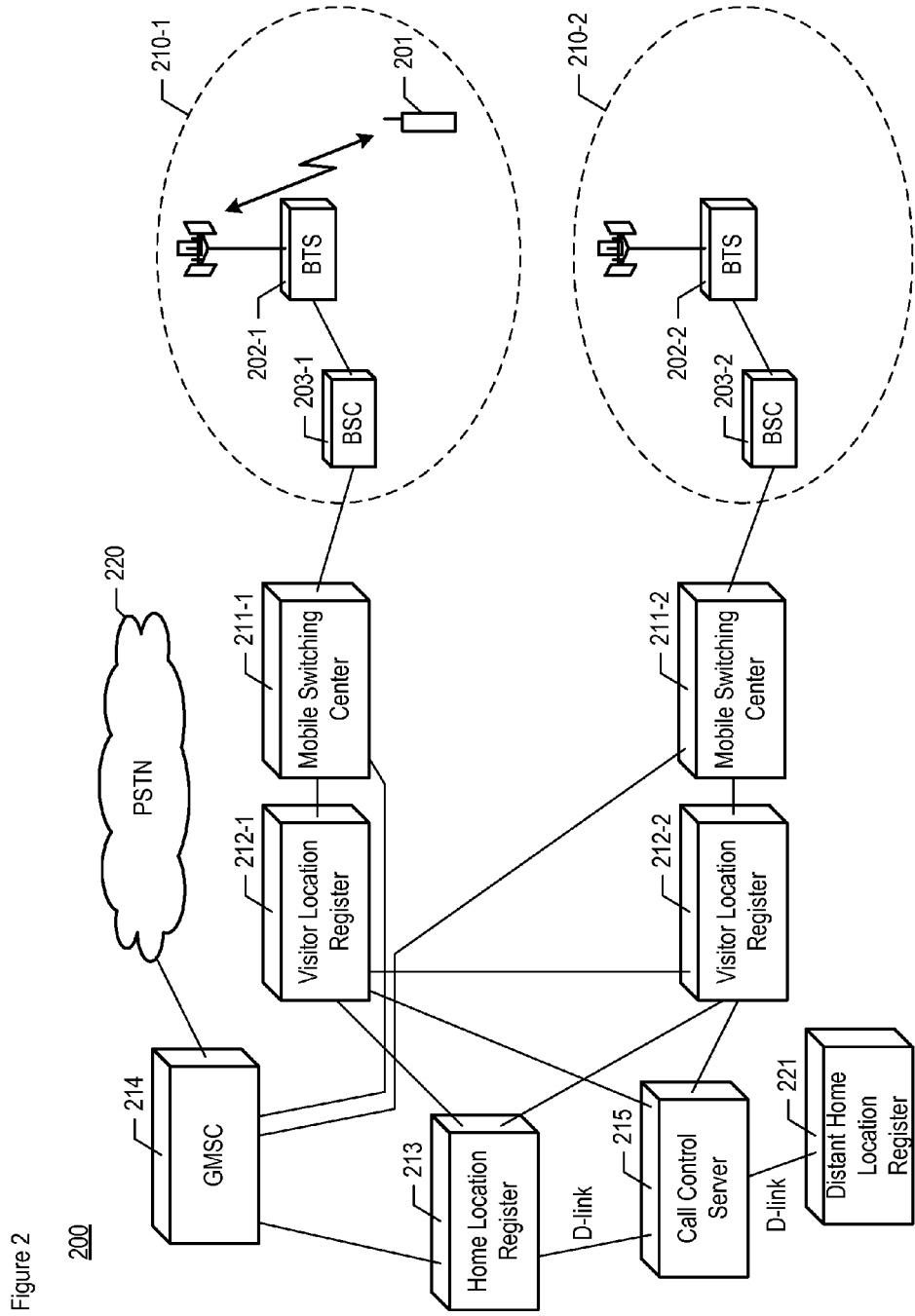
FIG. 2 depicts a diagram of the salient components of wireless telecommunications system 200 in accordance with the illustrative embodiment of the present invention.

The following abbreviations are used in this specification:
GSM Global System for Mobile Communications
MS Mobile Station
BTS Base Transceiver Station
BSC Base Station Controller
MSC Mobile Switching Center
GMSC Gateway Mobile Switching Center
HLR Home Location Register
VLR Visitors Location Register
MAP Mobile Application Part
SS7 Signaling System No. 7
PSTN Public Switched Telephone Network
MSISDN Mobile Subscriber Integrated Services Digital Network-Number
IMSI International Mobile Subscriber Identity
TMSI Temporary Mobile Subscriber Identity
SIM Subscriber Identity Module Overview FIG. 2 depicts a diagram of the salient components of wireless telecommunications system 200 in accordance with the illustrative embodiment of the present invention. Wireless telecommunications system 200 comprises the depicted data-processing systems, which are interrelated as shown. The equipment that constitutes system 200 includes radio base station equipment, switching equipment, and service-control equipment, and is described in detail below. The illustrative embodiment provides wireless telecommunications service in well-known fashion to mobile station 201 when present in any of location areas 210-i, for i=1 through I, wherein I is a positive integer. Although I has a value of two in the illustrative embodiment, it will be clear to those skilled in the art, after reading this specification, how to make and use alternative embodiments of the present invention in which I has a value different than two. In other words, different embodiments are possible in which a different number of location areas are served than the two location areas present in the illustrative embodiment.

Some of the equipment present in system 200 is associated with a specific location area 210-i. Such equipment includes base transceiver station 202-i, base station controller 203-i, mobile switching center 211-i, and visitor location register 212-i. In contrast, some of the equipment present in system 200 is not associated with a specific location area. Such equipment includes home location registers 213 and 221, gateway mobile switching center 214, call control server 215, and public-switched telephone network 220. Mobile station 201 is not fixed to a particular location area, but can be associated with any location area, depending on its present location. As depicted, mobile station 201 is presently associated with location area 210-1.

With the exception of Distant HLR 221 and PSTN 220, wireless telecommunications system 200 represents a first wireless service provider's network. Distant HLR 221 is part of a second wireless service provider's network. The geographic regions covered by each provider's network can overlap geographically or can be geographically distinct. In regard to being geographically distinct, for example and without limitation, the first service provider's network can be situated in Mexico, while the second service provider's network can be situated in Germany. Meanwhile, PSTN 220 can be associated with a separate telecommunications provider entirely.

In accordance with the illustrative embodiment, wireless telecommunications service is provided to mobile station 201 according to the Global System for Mobile Communications (GSM) set of standards. After reading this disclosure, however, it will be clear to those skilled in the art how to make and use alternative embodiments of the present invention that operate in accordance with one or more other air-interface standards (e.g., Universal Mobile Telecommunications System "UMTS", Long Term Evolution "LTE", CDMA-2000, IS-136 TDMA, IS-95 CDMA, 3G Wideband CDMA, IEEE 802.11 WiFi, 802.16 WiMax, Bluetooth, etc.) in one or more frequency bands.

The elements of a GSM network have been previously described in this specification and are well known to those skilled in the art. To the extent that they are described further in this specification, it is primarily for the purposes of establishing or describing their relationship with respect to elements that are germane to embodiments of the present invention.

Mobile station 201 comprises the hardware and software necessary to be GSM-compliant and to perform the processes described below and in the accompanying figures. For example and without limitation, mobile station 201 is capable of:
  i. receiving an incoming (i.e., "mobile-terminated") telephone call or other communication (e.g., SMS text, email, media stream, etc.),
  ii. transmitting an outgoing (i.e., "mobile-originated") telephone call or other communication (e.g., SMS text, email, media stream, etc.), and
  iii. receiving, transmitting, or otherwise processing one or more signals in support of capabilities i and ii.

Mobile station 201 is mobile and can be within any location area 210-i. Although wireless telecommunications system 200 as depicted comprises only one mobile station, it will be clear to those skilled in the art, after reading this disclosure, how to make and use alternative embodiments of the present invention that comprise any number of mobile stations.

BTS 202-i communicates with mobile station 201 via radio and with BSC 203-i, all in well-known fashion. In accordance with the illustrative embodiment, each BTS 202-i has one or more antennas that are associated with the base station, in order to enable communication with mobile station 201. As is well known to those skilled in the art, base transceiver stations are also commonly referred to by a variety of alternative names such as access points, nodes (e.g., Node-B, eNode-B, etc.), network interfaces, etc.

Although the illustrative embodiment comprises one base transceiver station associated with each depicted location area, it will be clear to those skilled in the art, after reading this disclosure, how to make and use alternative embodiments of the present invention that comprise any number of base transceiver stations within each location area 210-*i*, wherein the number can vary from one location area to the next.

In accordance with the illustrative embodiment of the present invention, the base transceiver stations are terrestrial, immobile, and associated with location areas. It will be clear to those skilled in the art, after reading this disclosure, how to make and use alternative embodiments of the present invention in which some or all of the base transceiver stations are airborne, marine-based, or space-based, regardless of whether or not they are moving relative to the Earth's surface, and regardless of whether or not they are within the depicted location areas.

BSC 203-*i* communicates with BTS 202-*i* via an Abis link, and with MSC 211-*i* via an A-link, all in well-known fashion. Although the illustrative embodiment comprises a single base station controller in each location area 210-*i*, it will be clear to those skilled in the art, after reading this disclosure, how to make and use alternative embodiments of the present invention that comprise any number of base station controllers in each location area 210-*i*, wherein the number can vary from one location area to the next and wherein the number of BTSs associated with each BSC can vary.

MSC 211-*i* comprises a switch that orchestrates the provisioning of telecommunications service to mobile station 201 and the flow of information to and from VLR 212-*i*, as described below and in the accompanying figures. As is well known to those skilled in the art, mobile switching centers are also commonly referred to by other names such as mobility management entities (MME), wireless switching centers, mobile telephone switching offices (MTSO), routers, etc.

Although the illustrative embodiment comprises one mobile switching center associated with each location area 210-*i*, it will be clear to those skilled in the art, after reading this disclosure, how to make and use alternative embodiments of the present invention that comprise any number of mobile switching centers.

In accordance with the illustrative embodiment, all of the base transceiver stations and base station controller servicing mobile station 201 are associated with mobile switching center 211-*i*. It will be clear to those skilled in the art, after reading this disclosure, how to make and use alternative embodiments of the present invention in which any number of base transceiver stations and base station controllers are associated with any number of mobile switching centers.

Gateway mobile switching center (GMSC) 214 serves as a gateway between two networks, in this case the wireless network portion of system 200 that serves the location areas, and PSTN 220, for example and without limitation.

Visitor location register (VLR) 212-*i* is equipment for storing a database of the subscribers who have roamed into the jurisdiction of MSC 211-*i*, which is served by VLR 212-*i*. The data stored in VLR 212-*i* is either received from an HLR (e.g., HLR 213, distant HLR 221, etc.), or collected from mobile station 201, or both. In accordance with the illustrative embodiment of the present invention, VLR 212-*i* is capable of receiving one or more IMSIs from IMSI List 313, which is stored at call control server 215 as described below, and is capable of notifying server 215 whenever a mobile station corresponding to one of the received IMSIs is present in the location area served by the VLR.

Local home location register (HLR) 213 is equipment for storing a central database that contains details of each mobile station subscriber who is authorized to use one or more of location areas 210-1 and 210-2 as the subscriber's home network. HLR 213 stores details of every subscriber identity module (SIM) card issued by a wireless service provider. Each SIM has a unique identifier called an "international mobile subscriber identity," or "IMSI." An IMSI is a primary key to each HLR record. When the SIM card is coupled to a particular mobile station, the IMSI stored in the SIM serves to identify the mobile station. Another identifier that is associated with the SIM is a "MSISDN," which is often referred to as a "mobile subscriber integrated services digital network-number." Each MSISDN is also a primary key to the HLR record of a subscriber.

Although in some embodiments of the present invention there can be more than one HLR in system 200, each IMSI can be associated with only one logical HLR at a time.

Distant home location register (HLR) 221 is similar to local HLR 213, in that it is equipment for storing a central database that contains details of mobile station subscribers. Distant HLR 221's database, however, contains details of each mobile station subscriber who is authorized to use a wireless network that is outside of one or more of location areas 210-1 and 210-2, as the subscriber's home network. For example, mobile station 201's subscriber's home network is in Germany and location areas 210-1 and 210-2 are associated with a network in Mexico; consequently, distant HLR 221, in the German service provider's network, would have the details associated with the subscriber, while local HLR 213, in the Mexican service provider's network, would not. It is noted that the terms "local" and "distant" are merely used for pedagogical purposes in this specification, in order to distinguish between the two HLRs.

Call control server 215 comprises hardware and software that controls one or more services being provided to mobile 201, as described below and in the accompanying figures, in accordance with the illustrative embodiment of the present invention. It will be clear to those skilled in the art, after reading this disclosure, how to make and use call control server 215. Furthermore, although call control server 215 is depicted in FIG. 2 as physically distinct from the other equipment, it will be clear to those skilled in the art, after reading this disclosure, how to make and use alternative embodiments of the present invention in which call control server 215 is wholly or partially integrated with MSC 211-*i*, VLR 212-*i*, HLR 213, or another equipment.

Call Control Server 215

Figure 3:
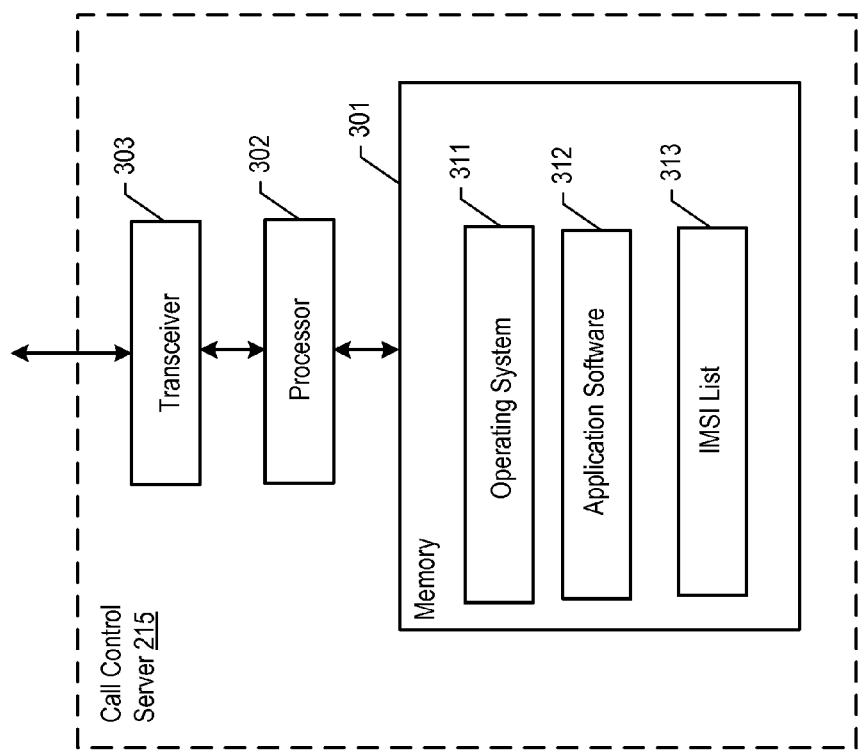
FIG. 3 depicts a block diagram of the salient components of call control server 215.

FIG. 3 depicts a block diagram of the salient components of call control server 215 in accordance with the illustrative embodiment of the present invention. Call control server 215 is a data-processing system that comprises: processor 301, memory 302, and transceiver 303, which are interconnected as shown.

Processor 301 is a general-purpose processor that is capable of executing operating system 311 and application software 312, and populating, updating, using, and managing IMSI List 313. It will be clear to those skilled in the art how to make and use processor 301.

Memory 302 is a non-volatile memory that stores:
 i. Operating system 311; and
 ii. Application software 312; and
 iii. IMSI List 313.
It will be clear to those skilled in the art how to make and use memory 302.

Application software 312 includes the call control that enables server 215 to interpose itself between an HLR (e.g., HLR 213, HLR 221, etc.) and the VLR currently serving mobile station 201, in order to control one or more services being provided to the mobile station.

IMSI List 313 is a list of the targeted IMSIs corresponding to mobile stations that are being controlled by server 215. The IMSI is a unique identification associated with all GSM, UMTS and LTE network mobile station users. It is stored as a 64-bit field in a SIM card, or equivalent, at the mobile station. The IMSI is usually presented as a 15-digit number, but can be shorter. The first three digits of the IMSI are the Mobile Country Code (MCC). The MCC digits are followed by the Mobile Network Code (MNC), which is either two digits (European standard) or three digits (North American standard). The remaining digits represent the Mobile Subscription Identification Number (MSIN) within the network's customer base.

In accordance with the illustrative embodiment of the present invention, the IMSIs on IMSI List 313 are entered via a user interface. In some embodiments of the present invention, the IMSIs can be provided to server 215 through other means (e.g., via a data network interface from HLR 213 or HLR 221, etc.).

In some embodiments of the present invention, a locally generated, temporary mobile subscriber identity (TMSI) is primarily used instead of the IMSI, in order to minimize transmission of the IMSI over the air and to prevent eavesdroppers from identifying and tracking the subscriber on the radio interface. Those who are skilled in the art, after reading this specification, will know how to make and use embodiments of the invention that use a "TMSI," instead of or in addition to the "IMSI," as an identifier of the mobile station. Furthermore, those who are skilled in the art, after reading this specification, will know how to implement embodiments of the invention that use a different type of mobile subscriber identity or mobile station identity than an IMSI and/or a TMSI, such as the MSISDN.

In accordance with the illustrative embodiment, application software 312 and IMSI List 313 reside in memory accessible to a single (logical) server. That is, these components are co-located. It some alternative embodiments of the present invention, however, these components are not co-located and reside on disparate memories accessible to disparate servers. Such servers communicate with one another in well-known fashion.

Transceiver 303 enables call control server 215 to transmit and receive information to and/or from one or more of the following: VLR 212-i, HLR 213, HLR 221, or another equipment. It will be clear to those skilled in the art how to make and use transceiver 303.

Operation of the Illustrative Embodiment

Figure 4:
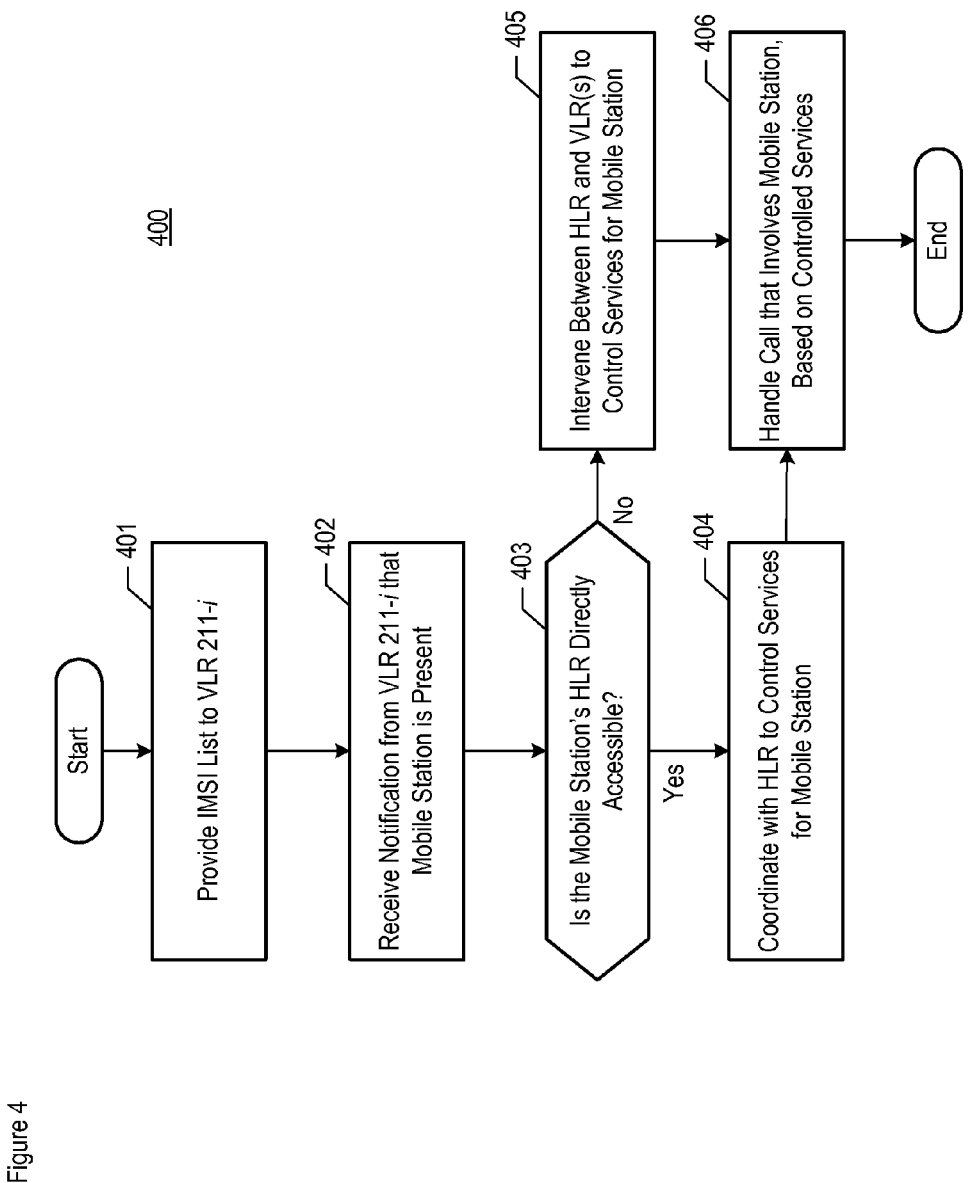
FIG. 4 depicts a flowchart of the salient processes performed in accordance with the illustrative embodiment of the present invention.

FIG. 4 depicts a flowchart of the salient processes performed in accordance with the illustrative embodiment of the present invention.

The processes performed by wireless telecommunications system 200 of the illustrative embodiment are depicted in the drawings (i.e., FIG. 2 and subsequent figures) as being performed in a particular order. It will, however, be clear to those skilled in the art, after reading this disclosure, that these operations can be performed in a different order than depicted or can be performed in a non-sequential order (e.g., in parallel, etc.). In some embodiments of the present invention, some or all of the depicted processes might be combined or performed by different devices. In some embodiments of the present invention, some of the depicted processes might be omitted.

In accordance with process 401, call control server 215 transmits at least a subset of IMSI List 313 to one or both of VLRs 212 (i.e., 212-1 and 212-2). In some embodiments of the present invention, IMSIs are provided more than once to VLRs 212. In some alternative embodiments of the present invention, the IMSIs are instead provided to VLRs 212 other than by data transmission (e.g., through a technician entering the IMSIs, etc.).

In accordance with process 401, call control server 215 receives notification from VLR 212-i that a targeted mobile station corresponding to a targeted IMSI is present in location area 210-i. In some alternative embodiments, server 215 is notified about a target mobile station's presence through other means (e.g., through a technician manually entering the IMSI of a present mobile station, etc.).

In accordance with process 402, server 215 determines the targeted mobile station's HLR in well-known fashion. If the mobile station's HLR is directly accessible by call control server 215, meaning that the server is permitted to change one or more subscriber data values at the HLR, then process execution proceeds to process 404. For example and without limitation, a mobile station's HLR is directly accessible when prior arrangements have been made with the service provider that has control of the HLR, most likely when the mobile station is present in its home wireless network.

The term "subscriber data" is used to designate all information associated with a subscription, as defined in "Digital cellular telecommunications system (Phase 2+); Organization of subscriber data (GSM 03.08 version 5.1.0)," which is incorporated herein by reference.

If the mobile station's HLR is not directly accessible by server 215, then process execution proceeds to process 405. For example and without limitation, a mobile station's HLR is not directly accessible when no prior arrangements have been made with the service provider that has control of the HLR, most likely when the mobile station is not present in its home wireless network and the service provider controlling the distant HLR is uncooperative. For pedagogical purposes, distant HLR 221 is not directly accessible by server 215.

In accordance with process 404, the mobile station's HLR is directly accessible; thus, server 215 coordinates with the mobile station's HLR to modify the services provided to the mobile. For pedagogical purposes, local HLR 213 is directly accessible by server 215, and, as a result, server 215 coordinates with HLR 213 of the cooperative service provider. In some alternative embodiments, at least some of the coordination with HLR 213 is performed manually.

In coordinating with accessible HLR 213, server 215 instructs the HLR to modify the call-related services that are provided to the targeted mobile station. For example and without limitation, server 215 can instruct HLR 213 to modify one or more of the following permissions specified as part of the subscriber data:
  i. outgoing calls
  ii. incoming calls
  iii. roaming
  iv. premium rate calls
  v. supplementary services management
  vi. registration of call forwarding
  vii. invocation of call transfer.

In accordance with process 405, the mobile station's HLR is not directly accessible; thus, server 215 controls services provided to the targeted mobile station by interposing between the mobile station's HLR and the VLR currently serving the mobile station. Process 405 is described below and in FIG. 5. For pedagogical purposes, mobile station 201 is a targeted mobile, distant HLR 221 is the mobile station 201's HLR, and VLR 212-1 is the serving VLR. In some alternative embodiments, at least some of the coordination with the serving VLR is performed manually, as the VLR is at least partially accessible.

In controlling services provided to targeted mobile station 201 when an inaccessible HLR 221 is involved, server 215 interposes between the HLR and serving VLR 212-1, and represents itself to HLR 221 as the serving VLR, as described below and in FIG. 5. As part of its posing as the serving VLR, server 215 first requests the set of subscriber data identifying the services from HLR 221 that mobile station 201 is entitled to be provided, receives the set, and then modifies the received set. For example and without limitation, server 215 can instruct HLR 213 to modify one or more of the services enumerated above and with respect to process 404.

In accordance with either process 404 or 405, call control server 215 controls at least some of the services provided to a targeted mobile station, such that either the mobile station or subscriber, or both, is unaware of change to the services being provided. In some embodiments of the present invention, the service changes involve a narrowing, restricting, or denial of at least some services that the mobile station and its subscriber would be otherwise entitled to receive.

In some alternative embodiments of the present invention, call control server 215 controls at least some of the services provided to one or more mobile stations in the location area in which a targeted mobile station is present. For example and without limitation, when a targeted mobile station is determined to be present in a particular location area, server 215 may control a second mobile station's services, multiple mobile stations' services, or the services for all mobile stations that are present in that location area and possibly in other location areas.

After process 404 or 405, and in accordance with process 406, call control server 215 and serving VLR 212-1 handle a call that involves mobile station 201, based on the updated service permissions. Process 406 is described below and in FIG. 6.

After process 406, some all or of the processes described above can be repeated, for one or more of the targeted IMSIs.

Interposing Between HLR 221 and VLR 212-1

Figure 5:
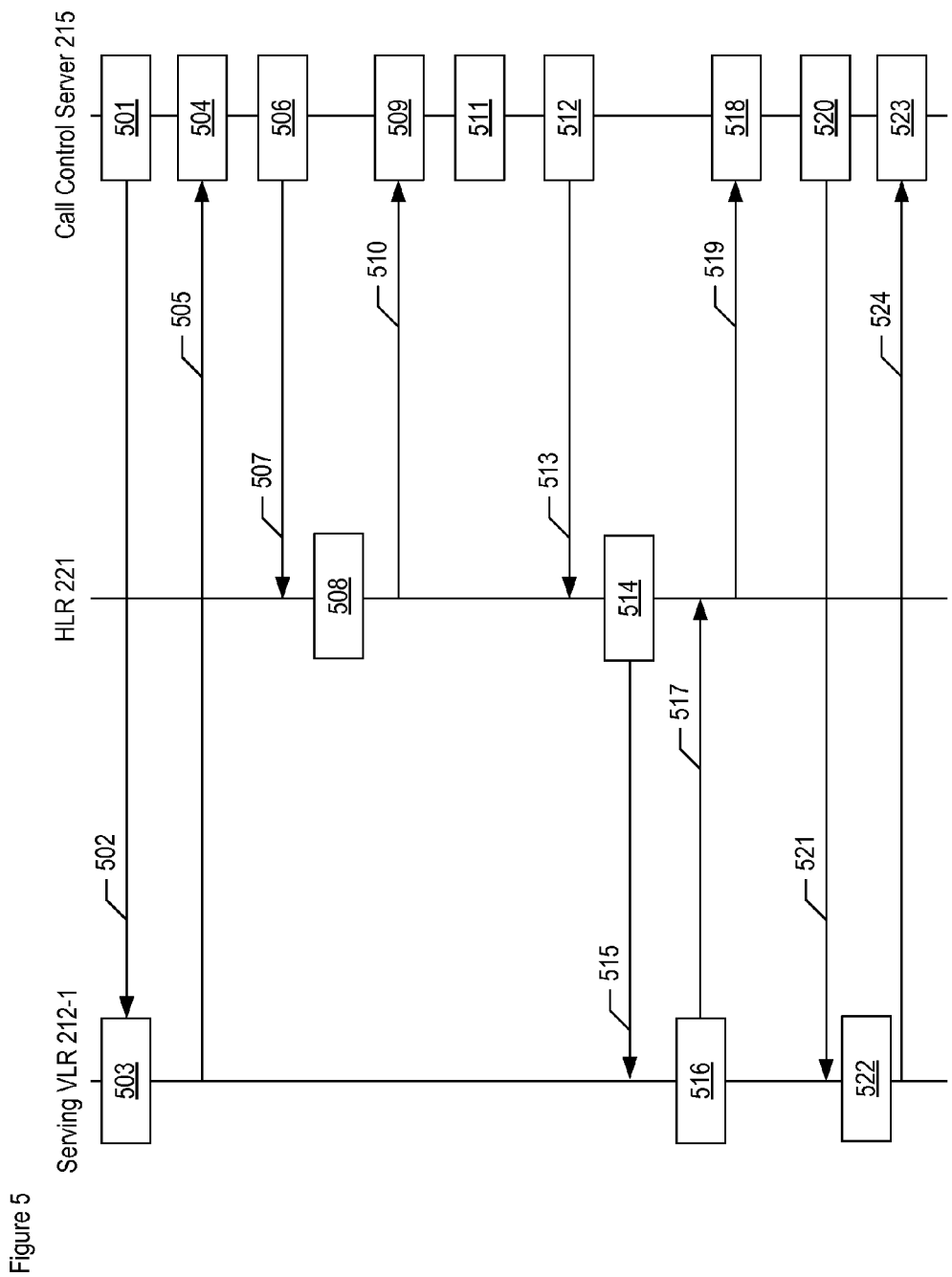
FIG. 5 depicts a message flow diagram of the salient processes performed and messages exchanged in accordance with process 405.

FIG. 5 depicts a message flow diagram of the salient processes performed and messages exchanged in accordance with process 405—controlling services provided to mobile station 201 by interposing between HLR 221 and VLR 212-1.

A brief discussion of the types of messages exchanged between HLR 221, call control server 215, and VLR 212-1 is provided here. In accordance with the illustrative embodiment, server 215 utilizes standardized messages in order to ensure compatibility with the HLR and VLR. Compatibility with at least HLR 221 is necessary because it is assumed that no hardware or software modifications would be possible at HLR 221. This is because the service provider of a targeted mobile station and subscriber would likely be uncooperative and, therefore, would not permitted the HLR to be directly accessed, much less altered. The standardized messages used in the illustrative embodiment are described in detail in "Digital cellular telecommunications system (Phase 2+); Mobile Application Part (MAP) specification (GSM 09.02), Version 5.3.0," which is incorporated herein by reference.

As one example of a standardized message utilized, server 215 is configured to transmit a MAP/D UPDATE LOCATION message to HLR 221, having the effect of HLR 221 updating its record to point to server 215 as the new VLR until otherwise notified. Server 215 is also configured to subsequently receive a MAP/D SUBSCRIBER DATA message, thereby acquiring service-related and other information about targeted mobile station 201.

Standardized messages are used in accordance with the illustrative embodiment. However, it will be clear to those skilled in the art, after reading this specification how to make and use alternative embodiments in which one or more alternative messages, standardized or otherwise, are used instead of the standardized messages described below.

Referring to FIG. 5, at process 501 server 215 transmits MAP/G SEND PARAMETERS message 502 to serving VLR 212-1.

At process 503, serving VLR 212-1 recognizes the SS7 source address in message 502 as that of call control server 215. As a result, VLR 212-1 is made aware that VLR 212-1 will be interposing between the VLR and HLR 221.

In some embodiments, receipt of message 502 indicates to VLR 212-1 to change at least one service that is provided to targeted mobile station 201 (e.g., block incoming calls, block outgoing calls, etc.). In such embodiments, VLR changes the service for a predetermined amount of time or until further notice, for example and without limitation.

At process 504, server 215 receives MAP/G SEND PARAMETERS RESULT message 505 from VLR 212-1, which, among other parameters, provides the IMSI of targeted mobile station 201 to server 215.

At process 506, server 215 transmits MAP/D UPDATE LOCATION message 507 to HLR 221. This has the effect of causing HLR 221, at process 508, to update its record to treat server 215 as the new VLR until otherwise notified.

At process 509, server 215 receives MAP/D INSERT SUBSCRIBER DATA message 510, which HLR 221 sends in response to receiving message 507.

In receiving message 510, server 215 acquires, among other subscriber data about targeted mobile station 201, the services provisioned to the mobile by its home service provider. At process 511, server 215 generates a second set of subscriber data comprising a modified parameter whose value differs from the corresponding parameter in the first set of parameter data received in message 510. The generating of the second set of data is based on the value of the targeted mobile station's IMSI. The value of the modified parameter narrows, restricts, or denies an end-user service to the mobile station, relative to the value of the corresponding parameter in the first set.

At process 512, server 215 transmits MAP/D INSERT SUBSCRIBER DATA RESULT message 513 to HLR 221 in response to receiving message 510.

At process 514, HLR 221 transmits MAP/D CANCEL LOCATION message 515 to serving VLR 212-1.

Because VLR 212-1 has previously received message 502 from server 215, the VLR knows to ignore message 515, to the extent that it refrains from deleting the record that contains the subscriber data associated with mobile station 201, and by continuing to serve as the VLR of mobile station 201.

At process 516, VLR 212-1 transmits MAP/D CANCEL LOCATION RESULT message 517 to HLR 221 because the HLR expects it in response to having sent message 515.

At process 518, server 215 receives MAP/D UPDATE LOCATION RESULT message 519, indicating that HLR 221 has updated its record of the location of mobile station 201.

At process 520, server 215, essentially posing as mobile station 201's HLR, transmits MAP/D INSERT SUBSCRIBER DATA message 521, which the server sends in response to receiving message 519, in some embodiments. Message 521 contains at least a portion of the second set of subscriber data.

In receiving message 521, among other information about targeted mobile station 201 contained in the second set of subscriber data, VLR 212-1 is made aware of the services allowed for mobile station 201 as generated by server 215 at process 511.

In some embodiments of the present invention, at process 522 VLR 212-1 updates its record of the services allowed for mobile station 201, in response to receiving message 521.

At process 523, server 215 receives MAP/D INSERT SUB-SCRIBER DATA RESULT message 524 from VLR 212-1, which was sent in response to the VLR receiving message 521.

At some point, mobile station 201 may leave serving location area 210-1. For example, mobile station 201 may travel into location area 210-2, which is served by VLR 212-2. Acquiring VLR 212-2, which serves location area 210-2, may not be aware at that particular moment that call control server 215 is controlling mobile station 201. Consequently, acquiring VLR 212-2 would initiate a location update procedure in well-known fashion, by sending a MAP/D UPDATE LOCATION message to HLR 221. In this scenario, HLR 221 ultimately sends a MAP/D CANCEL LOCATION message to server 215 because the HLR believes server 215 to be the serving VLR, which is now losing the mobile station to the acquiring VLR. In accordance with the illustrative embodiment, server 215 goes along with the location update/cancel location procedure, but the server then regains control of the mobile station by repeating the process described in FIG. 5, only with VLR 212-2 as the serving VLR (i.e., instead of VLR 212-1). This regaining of control by server 215 can be repeated as needed, as mobile station 201 travels from one location area to the next.

Handling an Incoming Call to Mobile Station 201

Figure 6:
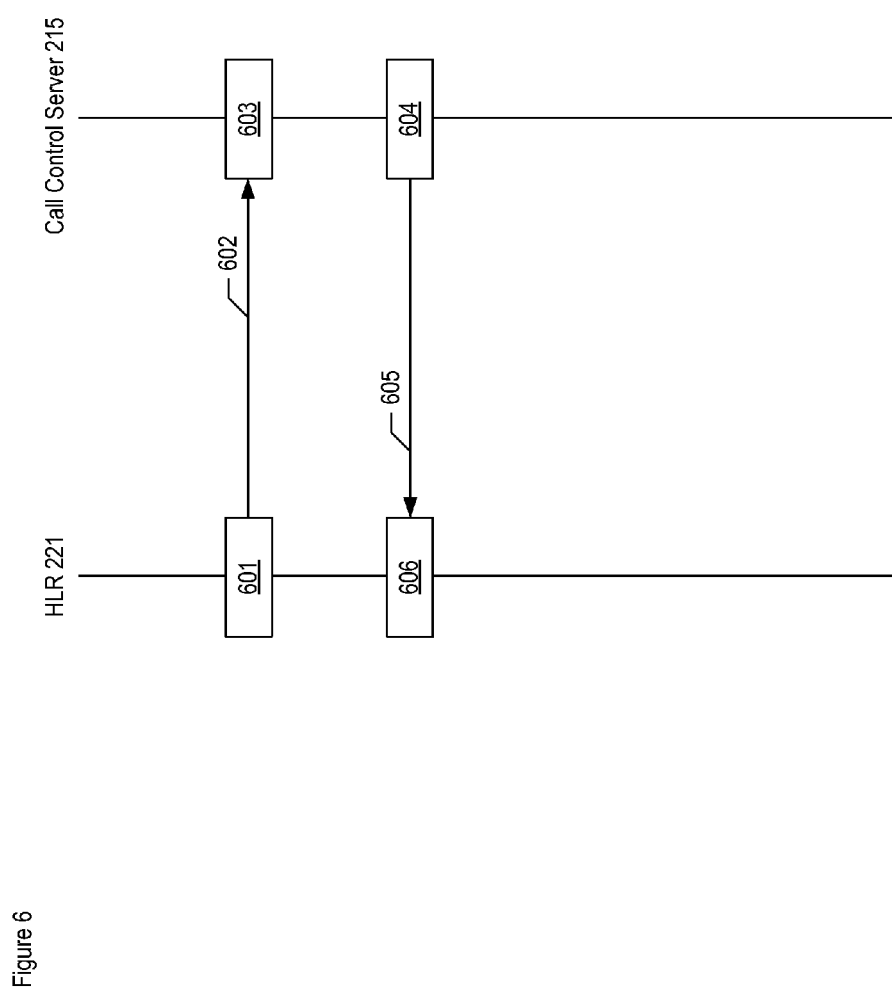
FIG. 6 depicts a message flow diagram of the salient processes performed and messages exchanged in accordance with process 406 for an incoming call.

FIG. 6 depicts a message flow diagram of the salient processes performed and messages exchanged in accordance with process 406—handling an incoming call (aka a "mobile-terminated" call) to targeted mobile station 201, based on the services control performed at task 404 or 405.

In accordance with task 601, HLR 221 processes a message received from mobile station 201's gateway MSC. The received message queries the HLR for information about how to route the call to the serving VLR and MSC. HLR 221 looks up the MSISDN that was called and determines the IMSI and the SS7 address for the VLR that is servicing mobile station 201. Because call control server 215 had previously represented itself as the serving VLR of mobile station 201, HLR 221 has server 215's SS7 address as the servicing address.

HLR 221 uses server 215's SS7 address to contact the server via message 602, as if it were the serving VLR. Message 602 is used to request assignment of a mobile station roaming number (MSRN) to the call.

In accordance with process 603, and in response to receiving message 602, server 215 accesses its IMSI List 313 and determines the IMSI to be that of a targeted mobile—in this case, mobile station 201. Server 215 also determines that a subscriber data parameter that corresponds to mobile station 201 indicates that the incoming call is to be blocked. Consequently, in accordance with process 704, server 215 transmits message 605 to HLR 221 refusing the request of MSRN assignment to the call, in well-known fashion. In other words, server 215 provides blocking (barring) treatment for the incoming call, while refraining from indicating to the HLR the specific nature of the refusal (i.e., mobile station 201 being a targeted mobile station).

In some alternative embodiments of the present invention, call control server 215 delegates the rejection of the call to the serving VLR, which has already been made aware of targeted mobile 201 and its modified subscriber data parameters, as described above and in FIG. 5. In these alternative embodiments, server 215 meanwhile proceeds with providing the MSRN to HLR 221 in well-known fashion, thereby continuing with the call-setup attempt, in which the serving VLR will ultimately block the incoming call.

In accordance with process 606, in response to receiving message 605, HLR 221 provides appropriate call treatment, in well-known fashion.

Handling an Outgoing Call from Mobile Station 201

Figure 7:
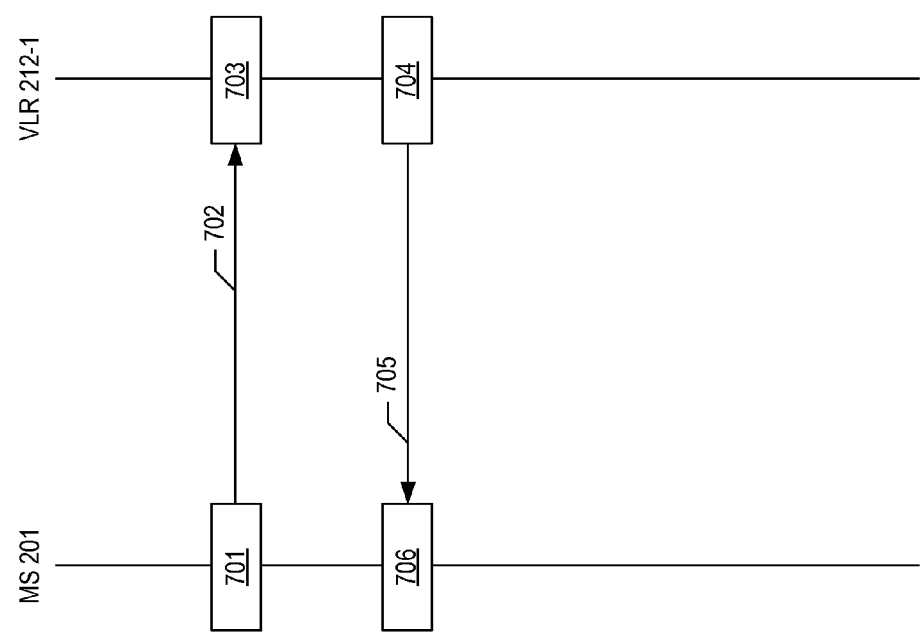
FIG. 7 depicts a message flow diagram of the salient processes performed and messages exchanged in accordance with process 406 for an outgoing call.

FIG. 7 depicts a message flow diagram of the salient processes performed and messages exchanged in accordance with process 406—handling an outgoing call (aka a "mobile-originated" call) from targeted mobile station 201, based on the services control performed at task 404 or 405.

In accordance with task 701, mobile station 201 processes input received from its user subscriber to place a call. Station 201 transmits an origination message via message 702, which passed along by BTS 202-1 and BSC 203-1 to MSC 211-1 and VLR 212-1, in well-known fashion. Message 702 is used to request that a call be set up between mobile station 201 and the far-end party associated with the digits dialed by the user subscriber.

In accordance with process 703, and in response to receiving message 702, VLR 212-1 determines the IMSI to be that of a targeted mobile—in this case, mobile station 201. VLR 212-1 also determines that a subscriber data parameter that corresponds to mobile station 201 indicates that the outgoing call is to be blocked. Consequently, in accordance with process 704, VLR 212-1 instructs MSC 211-1 to transmit message 705 to station 201, rejecting the call setup request in well-known fashion. VLR 212-1 coordinates this with MSC 211-1 so as to block (bar) the outgoing call, while refraining from indicating to mobile station 201 the specific nature of the call rejection. For example, a message specifying "reorder" can be sent to the mobile station, and without a particular reason being specified for the reorder.

In accordance with process 706, in response to receiving message 705, mobile station 201 provides appropriate call treatment to its user, in well-known fashion.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, by a data-processing system, i) a first set of subscriber data that is associated with a predetermined mobile station and ii) an identifier of the mobile station;
generating, by the data-processing system, a second set of subscriber data comprising a modified parameter whose value differs from that of a received parameter in the received first set of subscriber data, the received parameter corresponding to the modified parameter in the second set, wherein the generating of the second set is based on the value of the received identifier of the mobile station, and wherein the value of the modified parameter restricts an end-user service to the mobile station, relative to the value of the corresponding received parameter in the first set;
transmitting, by the data-processing system, the second set of subscriber data to a first Visitor Location Register (VLR) serving a location area in which the mobile station is present;

receiving, by the data-processing system, an Update Location message from a second VLR that is acquiring the mobile station from the first VLR; and transmitting, to the second VLR, an Insert Subscriber Data message, comprising the second set of subscriber data.

2. The method of claim 1 wherein the value of the modified parameter specifies the barring of outgoing calls from the mobile station.

3. The method of claim 1 wherein the data-processing system transmits the second set of subscriber data as part of an Insert Subscriber Data message.

4. The method of claim 1 further comprising transmitting a first message, by the data-processing system, to the Home Location Register (HLR) of the mobile station, wherein the first message comprises the identifier of the mobile station, and wherein the data-processing system receives the first set of subscriber data from the HLR in response to the transmitting of the first message.

5. The method of claim 4 wherein the data-processing system transmits the first message such that the data-processing system appears to the HLR as a VLR that is acquiring the mobile station.

6. The method of claim 4 further comprising:
receiving, by the data-processing system, notification from the HLR of an incoming call to the mobile station; and
blocking the incoming call, based on the value of the modified parameter.

7. A method comprising:
transmitting a first message, by a data-processing system, to the Home Location Register (HLR) of a predetermined mobile station, such that the data-processing system appears to the HLR as a Visitor Location Register (VLR) that is acquiring the mobile station, wherein the first message comprises an identifier of the mobile station;
receiving a second message, by the data-processing system, from the HLR in response to transmitting the first message, wherein the second message comprises a first set of subscriber data that is associated with the mobile station;
generating, by the data-processing system, a second set of subscriber data comprising a modified parameter whose value differs from that of a received parameter in the first set of subscriber data, the received parameter corresponding to the modified parameter in the second set, wherein the generating of the second set is based on the value of the identifier of the mobile station, and wherein the value of the modified parameter restricts an end-user service to the mobile station, relative to the value of the corresponding received parameter in the first set;
receiving, by the data-processing system, an Update Location message from a second VLR that is acquiring the mobile station from a first VLR; and
transmitting, to the second VLR, an Insert Subscriber Data message comprising the second set of subscriber data, in response to receiving the Update Location message.

8. The method of claim 7 wherein the value of the modified parameter specifies the barring of outgoing calls from the mobile station.

9. The method of claim 7 further comprising:
receiving, by the data-processing system, notification from the HLR of an incoming call to the mobile station; and
blocking the incoming call, based on the value of the modified parameter.

10. The method of claim 7 wherein the first and second messages are mobile application part (MAP) messages.

11. The method of claim 10 wherein the first message is an Update Location message.

12. The method of claim 10 wherein the second message is an Insert Subscriber Data message.

13. A method comprising:
transmitting a first message, by a data-processing system, to a first Visitor Location Register (VLR) serving a predetermined mobile station, wherein the first message comprises an identifier of the mobile station;
transmitting a second message, by the data-processing system, to the Home Location Register (HLR) of the mobile station, such that the data-processing system appears to the HLR as a VLR that is acquiring the mobile station, wherein the second message comprises the identifier of the mobile station;
receiving a third message, by the data-processing system, from the HLR in response to transmitting the second message, wherein the third message comprises a first set of subscriber data that is associated with the mobile station;
generating, by the data-processing system, a second set of subscriber data comprising a modified parameter whose value differs from that of a received parameter in the first set of subscriber data, the received parameter corresponding to the modified parameter in the second set, wherein the generating of the second set is based on the value of the identifier of the mobile station;
receiving, by the data-processing system, an Update Location message from a second VLR that is acquiring the mobile station from the first VLR; and
transmitting, to the second VLR, an Insert Subscriber Data message comprising the second set of subscriber data, in response to receiving the Update Location message;
wherein the second message indicates to the HLR to transmit a fourth message to the first VLR, and wherein the first message indicates to the first VLR to refrain from deleting subscriber data that would otherwise occur upon receipt of the fourth message by the first VLR.

14. The method of claim 13 wherein the value of the modified parameter restricts an end-user service to the mobile station, relative to the value of the corresponding received parameter in the first set.

15. The method of claim 13 transmitting to the first VLR, by the data-processing system, an Insert Subscriber Data message comprising the second set of subscriber data, wherein the first VLR is serving a location area in which the mobile station is present.

16. An apparatus comprising:
a receiver for receiving i) a first set of subscriber data that is associated with a predetermined mobile station, ii) an identifier of the mobile station, and iii) from a second Visitor Location Register (VLR) that is acquiring the mobile station from a first VLR, an Update Location message;
a processor for generating a second set of subscriber data comprising a modified parameter whose value differs from that of a received parameter in the received first set of subscriber data, the received parameter corresponding to the modified parameter in the second set, wherein the generating of the second set is based on the value of the received identifier of the mobile station, and wherein the value of the modified parameter restricts an end-user service to the mobile station, relative to the value of the corresponding received parameter in the first set; and
a transmitter for transmitting i) the second set of subscriber data to the first VLR when the first VLR is serving a location area in which the mobile station is present and ii) an Insert Subscriber Data message comprising the second set of subscriber data, to the second VLR.

17. The apparatus of claim 16 wherein the value of the modified parameter specifies the barring of outgoing calls from the mobile station.

18. The apparatus of claim 16 wherein the transmitter transmits the second set of subscriber data as part of an Insert Subscriber Data message.

19. The apparatus of claim 16 wherein the transmitter is also transmitting a first message to the Home Location Register (HLR) of the mobile station, wherein the first message comprises the identifier of the mobile station, and wherein receiver receives the first set of subscriber data from the HLR in response to the transmitting of the first message.

20. The apparatus of claim 19 wherein the apparatus is a server, and wherein the transmitter transmits the first message such that the server appears to the HLR as a VLR that is acquiring the mobile station.

21. The apparatus of claim 19 wherein:
the transmitter is also for receiving notification from the HLR of an incoming call to the mobile station; and
the processor is also for blocking the incoming call, based on the value of the modified parameter.

22. An apparatus comprising:
a transmitter for transmitting i) a first message to the Home Location Register (HLR) of a predetermined mobile station, such that the apparatus appears to the HLR as a Visitor Location Register (VLR) that is acquiring the mobile station, wherein the first message comprises an identifier of the mobile station, and ii) to a second VLR that is acquiring the mobile station from a first VLR, an Insert Subscriber Data message comprising a second set of subscriber data, in response to receiving an Update Location message;
a receiver for receiving i) a second message from the HLR in response to transmitting the first message, wherein the second message comprises a first set of subscriber data that is associated with the mobile station, and ii) the Update Location message from the second VLR; and
a processor for generating the second set of subscriber data comprising a modified parameter whose value differs from that of a received parameter in the first set of subscriber data, the received parameter corresponding to the modified parameter in the second set, wherein the generating of the second set is based on the value of the identifier of the mobile station, and wherein the value of the modified parameter restricts an end-user service to the mobile station, relative to the value of the corresponding received parameter in the first set.

23. The apparatus of claim 22 wherein the value of the modified parameter specifies the barring of outgoing calls from the mobile station.

24. The apparatus of claim 22 wherein:
the receiver is also for receiving notification from the HLR of an incoming call to the mobile station; and
the processor is also for blocking the incoming call, based on the value of the modified parameter.

25. The apparatus of claim 22 wherein the first and second messages are mobile application part (MAP) messages.

26. The apparatus of claim 25 wherein the first message is an Update Location message.

27. The apparatus of claim 25 wherein the second message is an Insert Subscriber Data message.

28. An apparatus comprising:
a transmitter for transmitting:
i) a first message to a first Visitor Location Register (VLR) serving a predetermined mobile station, wherein the first message comprises an identifier of the mobile station, and
ii) a second message to the Home Location Register (HLR) of the mobile station, such that the apparatus appears to the HLR as a VLR that is acquiring the mobile station, wherein the second message comprises the identifier of the mobile station, and
iii) to a second VLR that is acquiring the mobile station from the first VLR, an Insert Subscriber Data message comprising a second set of subscriber data, in response to receiving an Update Location message; and;
a receiver for receiving:
i) a third message from the HLR in response to transmitting the second message, wherein the third message comprises a first set of subscriber data that is associated with the mobile station, and
ii) the Update Location message from the second VLR; and
a processor for generating the second set of subscriber data comprising a modified parameter whose value differs from that of a received parameter in the first set of subscriber data, the received parameter corresponding to the modified parameter in the second set, wherein the generating of the second set is based on the value of the identifier of the mobile station;
wherein the second message indicates to the HLR to transmit a fourth message to the first VLR, and wherein the first message indicates to the first VLR to refrain from deleting subscriber data that would otherwise occur upon receipt of the fourth message by the first VLR.

29. The apparatus of claim 28 wherein the value of the modified parameter restricts an end-user service to the mobile station, relative to the value of the corresponding received parameter in the first set.

30. The apparatus of claim 28 wherein the transmitter is also for transmitting to the first VLR an Insert Subscriber Data message comprising the second set of subscriber data, wherein the first VLR is serving a location area in which the mobile station is present.

* * * * *